(12) United States Patent
Kim

(10) Patent No.: US 10,268,751 B2
(45) Date of Patent: Apr. 23, 2019

(54) METHODS, SYSTEMS, APPARATUSES, AND/OR NON-TRANSITORY COMPUTER READABLE MEDIA FOR PROVIDING EVENT-RELATED DATA OVER A NETWORK

(71) Applicant: NAVER Corporation, Seongnam-si, Gyeonggi-do (KR)

(72) Inventor: Do Youn Kim, Seongnam-si (KR)

(73) Assignee: Naver Corporation, Seongnam-si (KR)

( * ) Notice: Subject to any disclaimer, the term of this patent is extended or adjusted under 35 U.S.C. 154(b) by 433 days.

(21) Appl. No.: 15/071,596

(22) Filed: Mar. 16, 2016

(65) Prior Publication Data

US 2016/0275104 A1    Sep. 22, 2016

(30) Foreign Application Priority Data

Mar. 18, 2015   (KR) ........................ 10-2015-0037698

(51) Int. Cl.
*G06F 17/30* (2006.01)

(52) U.S. Cl.
CPC .. *G06F 17/30598* (2013.01); *G06F 17/30041* (2013.01); *G06F 17/30064* (2013.01)

(58) Field of Classification Search
CPC ......... G06F 17/30598; G06F 17/30041; G06F 17/30064
See application file for complete search history.

(56) References Cited

U.S. PATENT DOCUMENTS

2008/0004946 A1* 1/2008 Schwarz ............... G06Q 10/10
                                                                705/12
2009/0327244 A1* 12/2009 Rizal ................. G06F 17/30017
2010/0005394 A1*  1/2010 Dubnov ............. G06F 17/30029
                                                                715/733
2010/0077289 A1*  3/2010 Das ................... G06F 17/30265
                                                                715/230
2010/0123830 A1*  5/2010 Vunic ................. G06K 9/00711
                                                                348/700
2010/0174993 A1*  7/2010 Pennington ........... G06F 1/1616
                                                                715/738
2011/0213700 A1*  9/2011 Sant'Anselmo ....... G06Q 10/10
                                                                705/39

(Continued)

FOREIGN PATENT DOCUMENTS

| JP | 2005071307 A | 3/2005 |
| KR | 20110043145 A | 4/2011 |
| KR | 20120007590 A | 1/2012 |

OTHER PUBLICATIONS

Korean Office Action dated Apr. 13, 2016 to corresponding Korean Application No. 10-2015-0037698.

*Primary Examiner* — Leslie Wong
(74) *Attorney, Agent, or Firm* — Harness, Dickey & Pierce, P.L.C.

(57) ABSTRACT

Provided is a method of providing a plurality of pieces of data related to at least one of a plurality of pieces of content released through or generated from an event, the method including: collecting the plurality of pieces of data related to at least one of the plurality of pieces of content from at least one source; classifying the plurality of pieces of data based on which data is related to which content; and determining an order of the plurality of pieces of content and providing the classified plurality of pieces of data according to the determined order.

23 Claims, 9 Drawing Sheets

(56) References Cited

U.S. PATENT DOCUMENTS

| | | | |
|---|---|---|---|
| 2012/0219271 A1* | 8/2012 | Vunic | G06K 9/00711 |
| | | | 386/278 |
| 2013/0093899 A1* | 4/2013 | Curcio | G06F 17/30265 |
| | | | 348/159 |
| 2014/0089816 A1* | 3/2014 | DiPersia | G06F 3/0484 |
| | | | 715/753 |
| 2015/0082203 A1* | 3/2015 | James | H04N 21/23418 |
| | | | 715/756 |
| 2016/0014342 A1* | 1/2016 | Kim | H04N 1/00161 |
| | | | 348/231.3 |
| 2016/0149956 A1* | 5/2016 | Birnbaum | H04L 63/101 |
| | | | 726/1 |
| 2016/0162454 A1* | 6/2016 | Bargagni | G06F 17/2288 |
| | | | 715/745 |
| 2016/0165284 A1* | 6/2016 | Bargagni | H04N 21/2187 |
| | | | 725/12 |
| 2016/0228776 A1* | 8/2016 | Miura | A63F 13/12 |
| 2018/0012629 A1* | 1/2018 | Jaime | G11B 27/031 |
| 2018/0117477 A1* | 5/2018 | Miura | H04N 21/4781 |

\* cited by examiner

METHODS, SYSTEMS, APPARATUSES, AND/OR NON-TRANSITORY COMPUTER READABLE MEDIA FOR PROVIDING EVENT-RELATED DATA OVER A NETWORK

CROSS-REFERENCE TO RELATED APPLICATION

This U.S. non-provisional application claims the benefit of priority under 35 U.S.C. § 119 to Korean Patent Application No. 10-2015-0037698, filed on Mar. 18, 2015, in the Korean Intellectual Property Office (KIPO), the disclosure of which is incorporated herein in its entirety by reference.

BACKGROUND

1. Field

One or more example embodiments relate to a methods, systems, apparatuses, and/or computer readable media for providing data.

2. Description of the Related Art

Events, such as exhibitions, expositions, performances, concerts, weddings, parties, conferences, receptions, galas, sports games, etc., enhance the lives of people viewing the events, for example, by providing information, cultural values, and a way to pursue their interests. Such events provide various physical and mental values to modern people.

Recently, according to developments in communication technologies, various types of information are transferred through a data or communication network, such as the Internet.

SUMMARY

One or more example embodiments include a method, system, apparatus, and/or non-transitory computer readable media for providing data, whereby data related to various events, such as exhibitions, expositions, performances, and sports games, is providable.

One or more example embodiments include a method, system, apparatus, and/or non-transitory computer readable media for providing data, whereby data related to events, such as exhibitions and expositions, is providable while reflecting characteristics of places where the events are held.

One or more example embodiments include a method, system, apparatus, and/or non-transitory computer readable media for providing data, whereby data related to events, such as performances or sports games, is providable while reflecting time orders in which the events are held.

Additional aspects will be set forth in part in the description which follows and, in part, will be apparent from the description, or may be learned by practice of the presented example embodiments.

According to one or more example embodiments, a method of providing a plurality of pieces of data related to at least one of a plurality of pieces of content released through or generated from an event, the method including collecting, using at least one processor, the plurality of pieces of data related to the at least one of the plurality of pieces of content from at least one source, classifying, using the at least one processor, the plurality of pieces of data in accordance with a relationship between the data and the content, determining, using the at least one processor, an order of the plurality of pieces of content, and providing, using the at least one processor, the classified plurality of pieces of data according to the determined order using a user interface displayed on a display device.

The method may also include wherein the collecting comprises selecting, using the at least one processor, at least one related source including data related to the event from among the at least one source, and collecting, using the at least one processor, the plurality of pieces of data related to the at least one of the plurality of pieces of content from the at least one related source.

The method may also include wherein the event is an event in which content distinguishable according to locations is released, and the providing comprises determining an order of the plurality of pieces of content based on locations corresponding to where the plurality of pieces of content are located.

The method may also include wherein the event is an exhibition exhibiting various works of art, the plurality of pieces of content are works of art exhibited in the exhibition, and the plurality of pieces of data comprise at least one of photos of the works of art, drawings depicting the works of art, writings describing or evaluating the works of art, videos of the works of art, sound sources portraying or evaluating the works of art, scents portraying the works of art, and photos, drawings, writings, videos, and sound sources related to artists who produced the works of art.

The method may also include wherein the event is an exposition showcasing various products, the plurality of pieces of content are products showcased in the exposition, and the plurality of pieces of data comprise at least one of photos of the products, drawings depicting the products, writings describing or evaluating the products, videos of the products, sound sources portraying or evaluating the products, scents portraying the products, and photos, drawings, writings, videos, and sound sources of people who manufactured, designed, or invented the products.

The method may also include wherein the providing comprises determining an order of the plurality of pieces of content based on a desired order for viewing the plurality of pieces of content in the event.

The method may also include wherein the event is an event in which the plurality of pieces of content that are distinguishable are generated according to time, and the providing comprises determining an order of the plurality of pieces of content such that the pieces of content generated earlier has a higher order than the pieces of content generated later in time.

The method may also include wherein the event is a performance that is performed according to time, the plurality of pieces of content are acts of the performance, actions taking place during the performance, or performers participating in the performance, and the plurality of pieces of data comprise at least one of photos of the acts of the performance, drawings depicting the acts of the performance, writings describing or evaluating the acts of the performance, video showing the acts of the performance, sound sources portraying or evaluating the acts of the performance, photos, drawings, writings, video, and sound sources related to a manufacturer or planner of the performance, photos of the performers, drawings depicting the performers, writings describing or evaluating the performers, videos showing the performers, and sound sources portraying or evaluating the performers.

The method may also include wherein the event is a game performed according to time, the plurality of pieces of content are time periods of the game, plays performed during the game, or players participating in the game, and the plurality of pieces of data comprise at least one of the time periods of the game, drawings depicting the time periods of the game, writings describing or evaluating time periods of the game, videos of the time periods of the game, sound sources of the time periods of the game, photos of the players, drawings depicting the players, writings describing or evaluating the players, video of the players, and sound sources portraying or evaluating the players.

The method may also include wherein the providing comprises providing the plurality of pieces of data according to data related to one of the plurality of pieces of content.

The method may also include wherein the providing comprises generating a mini-map user interface showing the number of the plurality of pieces of content and an order of the plurality of pieces of content, and displaying the mini-map user interface as the user interface displayed on the display device.

The method may also include wherein the providing comprises providing the plurality of pieces of data such that data related to one piece of content from among the plurality of pieces of content is distinguishable from data related to another piece of content from among the plurality of pieces of content, and providing the mini-map user interface such that content related to data currently provided is distinguished from other pieces of content on the mini-map user interface.

According to one or more example embodiments, an apparatus for providing a plurality of pieces of data related to at least one of a plurality of pieces of content released through or generated from an event, the apparatus including a memory having computer readable instructions stored thereon, and at least one processor configured to execute the computer readable instructions to collect the plurality of pieces of data related to the at least one of the plurality of pieces of content from a plurality of sources, classify the plurality of pieces of data in accordance with a relationship between the data and the content, determine an order of the plurality of pieces of content, and provide the classified plurality of pieces of data according to the determined order using a user interface displayed on a display device.

The apparatus may also include wherein the at least one processor is further configured to select at least one related source including data related to the event from among the plurality of sources, and collect the plurality of pieces of data related to the at least one of the plurality of pieces of content from the at least one related source.

The apparatus may also include wherein the event is an event in which content distinguishable according to locations is released, and the at least one processor is configured to determine an order of the plurality of pieces of content based on locations corresponding to where the plurality of pieces of content are located.

The apparatus may also include wherein the at least one processor is configured to determine an order of the plurality of pieces of content based on a desired order of viewing the plurality of pieces of content in the event.

The apparatus may also include wherein the event is an event in which the plurality of pieces of content that are distinguishable are generated according to time, and the at least one processor is configured to determine an order of the plurality of pieces of content such that the pieces of content generated earlier has a higher order than the pieces of content generated later in time.

The apparatus may also include wherein the at least one processor is configured to generate a mini-map user interface showing the number of the plurality of pieces of content and an order of the plurality of pieces of the content, and provide the mini-map user interface as the user interface displayed on the display device.

The apparatus may also include wherein the at least one processor is configured to provide the plurality of pieces of data such that data related to one piece of content from among the plurality of pieces of content is distinguishable from data related to another piece of content from among the plurality of pieces of content, and generate the mini-map user interface such that content related to data currently provided is distinguished from other pieces of content on the mini-map user interface.

According to one or more example embodiments, an apparatus for providing a plurality of pieces of data related to at least one of a plurality of pieces of content released through or generated from an event, the apparatus including a memory having computer readable instructions stored thereon, and at least one processor configured to execute the computer readable instructions to receive the plurality of pieces of data related to the at least one of the plurality of pieces of content from a server, classify the plurality of pieces of data based on which data is related to which content, determine an order of the plurality of pieces of content, and display the classified plurality of pieces of data according to the determined order of the plurality of pieces of content using a display device.

According to one or more example embodiments, a system includes a memory having computer readable instructions stored thereon, and at least one processor configured to execute the computer readable instructions to receive a plurality of content related to a plurality of events, group the plurality of content in accordance with at least one characteristic of the plurality of content, determine a desired arrangement of the plurality of content based on the groupings of the plurality of content and the event associated with the plurality of content, generate a user interface associated with the determined desired arrangement, the user interface including a plurality of indicators associated with the determined desired arrangement, the plurality of indicators when activated displaying at least one associated content in accordance with the grouping of the plurality of content, and display the generated user interface on a display device.

The system may also include wherein the receiving includes receiving the plurality of content from a plurality of computing devices.

The system may also include wherein the displaying includes transmitting the generated user interface to a plurality of computing devices.

The system may also include wherein the grouping includes grouping the plurality of content in accordance with geolocation information associated with each of the plurality of content.

BRIEF DESCRIPTION OF THE DRAWINGS

The foregoing and other features of the inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
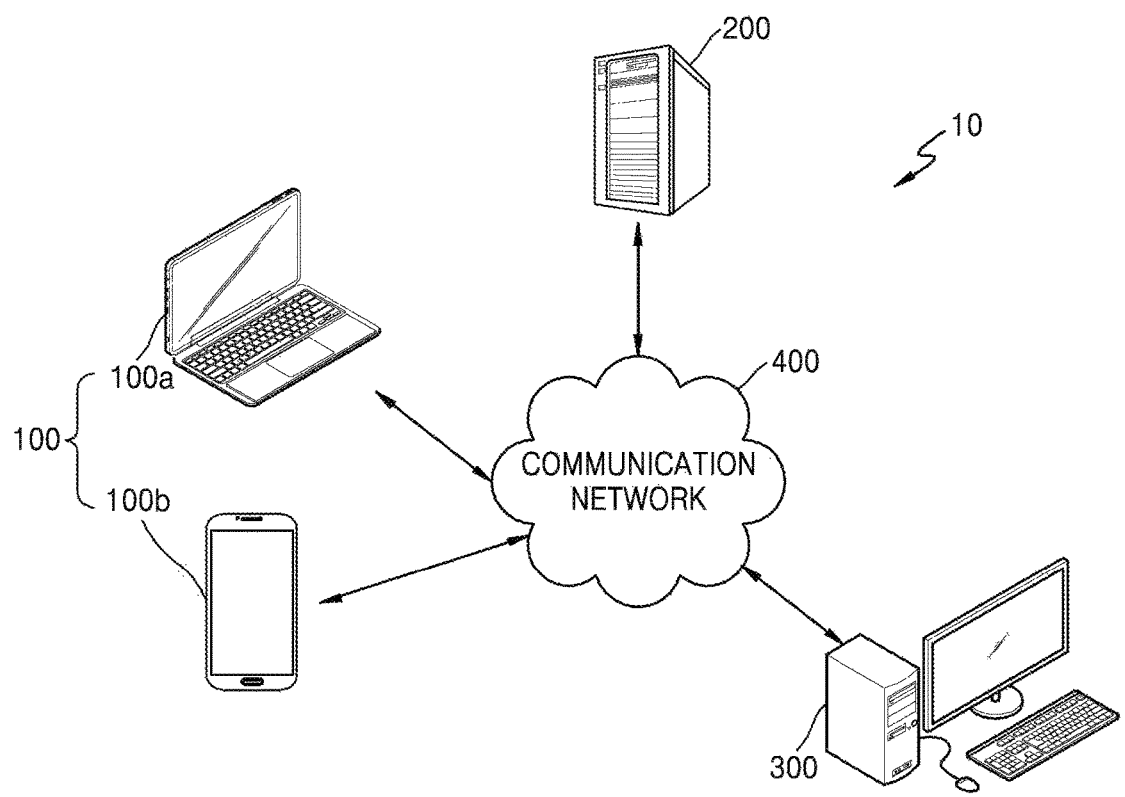
FIG. 1 is a diagram schematically illustrating a structure of a system for providing data, according to at least one example embodiment.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or coupled to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a diagram schematically illustrating a structure of a system 10 for providing data, according to at least one example embodiment.

Referring to FIG. 1, the system 10 according to at least one example embodiment may include at least one data display apparatus 100 and at least one data storage server 200. Also, the system 10 may include at least one data production apparatus 300. The system 10 may include a data communication network 400 that connects the data display apparatus 100, the data storage server 200, and/or the data production apparatus 300 for bi-directional communication. While only two data display apparatuses 100 (e.g., data display apparatuses 100a and 100b), one data storage server 200, and one data production apparatus 300 are illustrated in FIG. 1, the example embodiments are not limited thereto, and any combination and/or number of apparatuses and servers may be present in the various example embodiments.

For example, the data display apparatus 100 may be a computing apparatus capable of displaying data to a user. The data display apparatus 100 may be an apparatus capable of displaying data related to various events, such as an exhibition, an exposition, a performance, a concert, a wedding, a party, a conference, a reception, a gala, a rally, a speech, a sports game, etc. The data display apparatus 100 may be a communication terminal for transmitting and receiving data to and from another apparatus in a wired/wireless communication environment, such as communication network 400, but not limited thereto. The data display apparatus 100 may be any one of various apparatuses capable of displaying data stored in an internal or external memory on at least one display device (e.g., screen, monitor, projector, headset, etc.) of the data display apparatus 100. The display device of the data display apparatus 100 may be built-in and/or may be external to the data display apparatus 100. A plurality of the data display apparatuses 100 may be connected to the communication network 400. In FIG. 1, the data display apparatus 100 includes a first data display apparatus 100*a* that is a laptop, and a second data display apparatus 100*b* that is a smart phone, but is not limited thereto.

Examples of the data display apparatus 100 include a smart phone, a personal computer (PC), a tablet, a smart television (TV), a mobile phone, a personal digital assistant (PDA), a laptop, a media player, a micro-server, a global positioning system (GPS) device, a personal navigation device, an electronic book terminal, a digital broadcasting terminal, a kiosk, an MP3 player, a digital camera, a wearable device, a gaming console, a Virtual Reality (VR) display device, and other mobile or non-mobile computing apparatuses capable of connecting to a communication network, such as communication network 400, but are not limited thereto. Also, the data display apparatus 100 may include any one of various apparatuses for receiving user input (including voice input, touch input, etc.), such as a keyboard, a mouse, an electronic board, a touch screen, a microphone, etc. Also, the data display apparatus 100 may be an accessory, such as a watch, glasses, a hair band, or a ring, which has a communication function or a data processing function, but is not limited thereto.

In the present specification, an event may be any type of event (e.g., public or private event), such as an exhibition, an exposition, a performance, a concert, a wedding, a party, a conference, a reception, a gala, a rally, a speech, a sports game, etc. Also, such an event may release various types of content or may generate various types of content. For example, an event according to at least one example embodiment may be an exhibition exhibiting various works of art. In this case, the works of art exhibited in the exhibition may be pieces of content released through the event, as well as photographs, videos, news articles, social media postings, etc., related to the exhibition and/or works of art exhibited in the exhibition may be pieces of content released through the event. As another example, an event according to at least one example embodiment may be an exposition showcasing various products. In this case, the products showcased in the exposition may be pieces of content released through the event, as well as photographs, videos, news articles, social media postings, etc., related to the exposition and/or products showcased at the exposition may be pieces of content released through the event. As another example, an event according to at least one example embodiment may be a performance performed according to time. In this case, acts released through the performance, actions taking place during the performance, and/or artists participating in the performance may be pieces of content generated and/or released through the event, etc., as well as photographs, videos, news articles, social media postings, etc., related to the performance, actions, and/or artists may be pieces of content released through the event. As another example, an event according to at least one example embodiment may be a game played according to time. In this case, innings of the game, quarters of the game, sets of the game, first and second halves of the game, plays played during the game, and/or players participating in the game may be pieces of content generated and/or released through the event, etc., as well as photographs, videos, news articles, social media postings, etc., related to the game, plays, players, etc., may be pieces of content released through the event.

In the present specification, data related to an event may be data related to content released or generated from an event or may be data related to an event itself. For example, an event according to at least one example embodiment may be an exhibition and works of art exhibited in the exhibition may be pieces of content generated and/or released through the event. In this case, data related to the event may be photos of the works of art, drawings depicting the works of art, writings describing or evaluating the works of art, sound sources portraying or evaluating the works of art, scents portraying the works of art, videos portraying or discussing the works of art, etc., and/or photos, drawings, writings, videos, and/or sound sources related to artists of the works of art and/or the exhibition. As another example, an event according to at least one example embodiment may be an exposition and products showcased in the exposition may be pieces of content generated and/or released through the event. In this case, data related to the event may be photos of the products, drawings depicting the products, writings describing or evaluating the products, sound sources portraying or evaluating the products, scents portraying the products, videos portraying or discussing the products, etc., and/or photos, drawings, writings, videos, and/or sound sources related to people who manufactured, designed, invented the products and/or the exposition, etc. In other words, the data storage server 200 may store data related to a desired event, such as a certain exhibition, a certain exposition, etc. The data display apparatus 100 may request the data storage server 200 to provide the data related to the desired event, such as the certain exhibition or the certain exposition, through the communication network 400. According to such a request, the data storage server 200 may provide the data related to the desired event to the data display apparatus 100. The data display apparatus 100 may display the received data on the display device of the data display apparatus 100.

As another example, an event according to at least one example embodiment may be a performance, acts/segments of the performance, actions taking place during the performance, and/or artists/performers, participating in the performance may be pieces of content released and/or generated through the event, etc., as well as photographs, videos, news articles, social media postings, etc., related to the performance, actions, and/or artists/performers may be pieces of content generated and/or released through the event. In this case, data related to the event may be photos of the acts of the performance, drawings depicting the acts of the performance, writings describing of evaluating the acts of the performance, videos portraying or discussing the acts of the performance, sound sources portraying or evaluating the acts of the performance, photos, drawings, writings, or sound sources of a manufacturer or planner of the performance, photos of artists participating in the performance, drawings depicting the artists, writings describing or evaluating the artists, videos, and/or sound sources portraying or evaluating the artists. As another example, when an event according to at least one example embodiment is a game, and innings of the game, quarters of the game, sets of the game, first and second halves of the game, plays played during the game, and/or players participating in the game, etc., as well as photographs, videos, news articles, social media postings, etc., related to the game, plays, and/or players may be pieces of content generated and/or released through the event. In this case, data related to the event may be photos of the innings, quarters, sets, first half, or second half of the game, drawings depicting the innings, quarters, sets, first half, or second half of the game, writings describing or evaluating the innings, quarters, sets, first half, or second half of the game, video of the game, sound sources portraying or evaluating the innings, quarters, sets, first half, or second half of the game, photos of the players, drawings depicting the players, writings describing or evaluating the players, video of the players, and/or sound sources portraying or evaluating the players, etc. In other words, the data storage server 200 may store data related to a desired event, such as a certain performance and/or a certain game, etc. The data display apparatus 100 may request the data storage server 200 to provide the data related to the desired event, through the communication network 400. According to such a request, the data storage server 200 may provide the data related to the desired event to the data display apparatus 100. The data display apparatus 100 may display the received data on the display device of the data display apparatus 100.

The data storage server 200 may be a server storing data to be provided to the data display apparatus 100. The data storage server 200 may be a server providing data including data related to a certain event to the data display apparatus 100. In this case, the data storage server 200 may self-generate data to be provided to the data display apparatus 100 and/or receive data produced by the data production apparatus 300. In FIG. 1, one data storage server 200 is illustrated, but the example embodiments are not limited thereto and a plurality of the data storage server 200 may exist according to traffics or data amounts.

The data storage server 200 may be a server storing data including data related to a plurality of events. At this time, the data storage server 200 may distinguishably store data related to different events using unique identifiers or the like. For example, the data storage server 200 may store first data related to a certain exhibition that is a first event using a first unique identifier, and store second data related to a certain sports game that is a second event using a second unique identifier. In this case, the data storage server 200 may distinguishably store the first data and the second data via the unique identifiers. Accordingly, when a request to provide any one of the first and second data is received from the data display apparatus 100, the data storage server 200 may quickly and accurately provide data corresponding to the request using the unique identifiers.

In addition to a service of providing data related to a certain event, the data storage server 200 may provide a general search service and various other services for improving the usability, functionality, and/or convenience to the users. In other words, in addition to the service of providing data related to a desired service, the data storage server 200 may provide various services, such as a search service, a blog service, a messaging service, a social network service (SNS), a news service, shopping information service, etc. Additionally, the data storage server 200 may be a server that is connected to a server providing a portal service, such as a search service, an email service, a news service, a shopping service, etc., to provide a web page provided by the portal service to the data display apparatus 100 requesting for information to the portal service. Here, the data storage server 200 and the server providing a portal service may be a single server, physically separated servers, or a single physical server that is conceptually, virtually, and/or logically separated into several servers.

The data production apparatus 300 may be an apparatus producing data to be stored in the data storage server 200. For example, the data production apparatus 300 may be an apparatus used by a person who produces data related to various events, such as an exhibition, an exposition, a performance, a concert, a wedding, a party, a conference, a reception, a gala, a rally, a speech, a sports game, etc. For example, the data production apparatus 300 may be an apparatus used by an organizer, a participant, or another concerned person of a certain exposition to produce data including information about the certain exposition or photos of products showcased in the exposition. The data production apparatus 300 may be an apparatus transmitting the produced data to the data storage server 200 through the communication network 400. For example, the data production apparatus 300 may be an apparatus used by a person who produced data through the data production apparatus 300 to upload the data to a cyber space, such as a blog, a café, another web page, an email, a web portal, a smartphone app, etc. The data production apparatus 300 may be a communication terminal for transmitting and receiving data to and from another apparatus under a wired/wireless communication environment, such as the communication network 400. In FIG. 1, the data production apparatus 300 is a desktop PC, but the example embodiments are not limited thereto. Also, a plurality of the data production apparatuses 300 may be connected to the communication network 400.

Examples of the data production apparatus 300 include a smart phone, a PC, a tablet, a smart TV, a mobile phone, a PDA, a laptop, a media player, a micro-server, a GPS apparatus, a personal navigation device, an electronic book terminal, a digital broadcasting terminal, a kiosk, an MP3 player, a digital camera, a wearable apparatus, a gaming console, a Virtual Reality (VR) display device, and other mobile or non-mobile computing apparatuses capable of connecting to a communication network, such as communication network 400, but are not limited thereto. Also, the data production apparatus 300 may include any one of various apparatuses for receiving a user input (including voice input, touch input, etc.), such as a keyboard, a mouse, an electronic board, a touch screen, etc. Also, the data production apparatus 300 may be an accessory, such as a watch, glasses, a hair band, or a ring, which has a communication function or a data processing function, but is not limited thereto.

The communication network 400 may connect the data display apparatus 100 and the data storage server 200 to each other. In other words, the communication network 400 may provide a connection path such that data is transferred between the data display apparatus 100 and the data storage server 200. Examples of the communication network 400 include wired networks, such as a local area network (LAN), a wide area network (WAN), a metropolitan area network (MAN), a personal area network (PAN), an integrated service digital network (ISDN), etc., and wireless networks, such as wireless LAN, a code division multiple access (CDMA), a Global System for Mobile Communications (GSM), Bluetooth, satellite, etc., but are not limited thereto.

Figure 2:
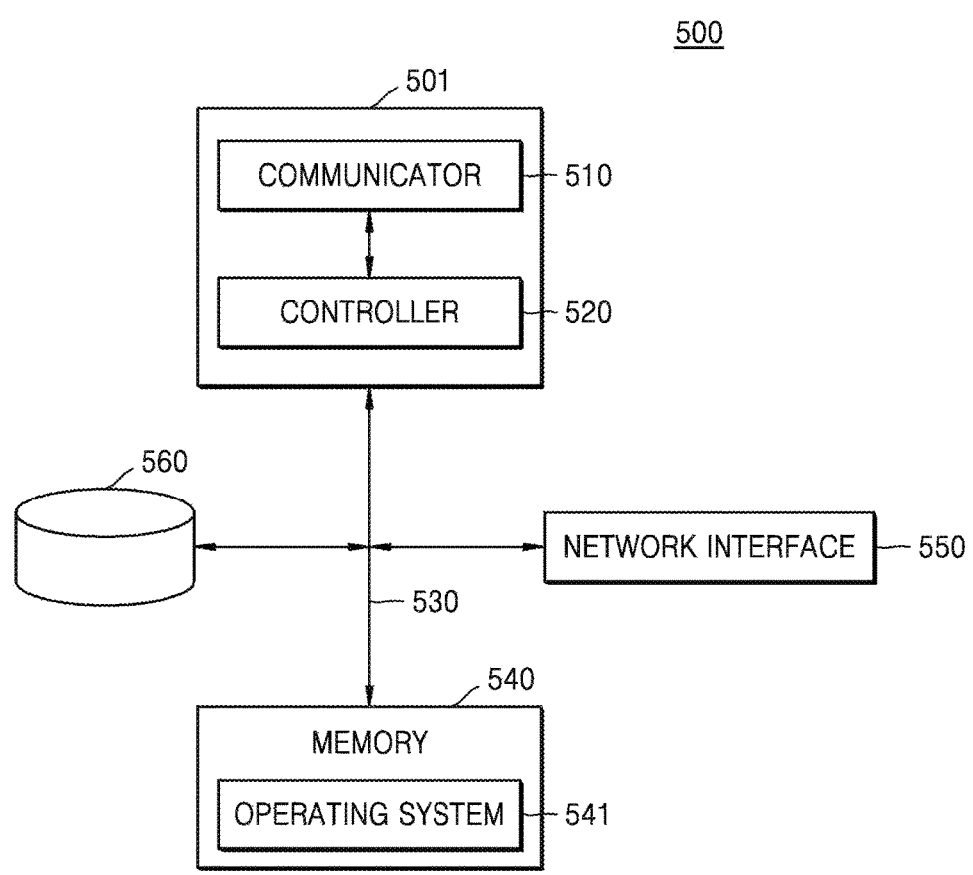
FIG. 2 is a block diagram of an internal structure of an apparatus for providing data, according to at least one example embodiment.

FIG. 2 is a block diagram of an internal structure of the apparatus included in the system 10 for providing data, according to at least one example embodiment.

Referring to FIG. 2, an apparatus 500 for providing data of the system 10, according to at least one example embodiment, may include at least one processor 501, a communication bus 530, a memory 540, a network interface 550, and/or a storage device 560. According to other example embodiments, the apparatus 500 may each include a greater or lesser number of constituent elements than the number of constituent elements shown in FIG. 2.

The processor 501 may be configured to access and/or execute programs, functions, instructions, and data stored on the memory 540. Once the program (e.g., computer readable instructions) is loaded into the processor 501, the processor 501 executes the program (e.g., computer readable instructions), thereby transforming the processor 501 into a special purpose processor. The processor 501 may be implemented as one or more processors, one or more processor cores, a distributed processing system, a network processing system, a cloud processing system, etc. The processor 501 may include and/or be specially configured to execute as a communicator 510 that may perform wired/wireless communication using the network interface 550 with at least one of the data display apparatus 100, the data storage server 200, and the data production apparatus 300. Examples of the network interface 550 include a Bluetooth communicator, a Bluetooth low energy (BLE) communicator, a near field communicator, a WLAN (Wi-Fi) communicator, a Zigbee communicator, an infrared data association (IrDA) communicator, a Wi-Fi direct (WFD) communicator, an ultra-wideband (UWB) communicator, a CDMA communicator, a GSM communicator, and/or an Ant+ communicator, but are not limited thereto. The communicator 510 may transmit and receive wired/wireless signals to and from at least one of the data display apparatus 100, the data storage server 200, the data production apparatus 300, a base station, etc., via the network interface 550 through the communication network 400. The wired/wireless signals may include various types of data including data related to at least one desired event.

The processor, communicator, and network interface will herein be referred to collectively as the communicator 510, for the sake of clarity. The communicator 510 may collect a plurality of pieces of data related to at least one of a plurality of pieces of content from a plurality of sources. For example, when the apparatus 500 is included in the data storage server 200, the communicator 510 may collect at least one piece of data related to at least one of a plurality of pieces of content from a plurality of sources. Here, the plurality of sources may be the plurality of data production apparatuses 300. The communicator 510 may selectively receive the plurality of pieces of data related to at least one of the plurality of pieces of content from among the data transmitted from the data production apparatuses 300, etc., or when the communicator 510 receives data including the plurality of pieces of data related to at least one of the plurality of pieces of content from the data production apparatuses 300, the controller 520 may select the plurality of pieces of data related to the at least one of the plurality of pieces of contents from the data received by the communicator 510.

The processor 501 may also include and/or be and/or be specially configured to execute as a controller 520 that may generally control overall operations of the apparatus 500. For example, the controller 520 may execute programs stored in a memory 540 included in the apparatus 500 to control the communicator 510.

The controller 520 may classify the plurality of pieces of data related to at least one of the plurality of pieces of content based on which data is related to which content. For example, when first data and second data included in the plurality of pieces of data related to at least one of the plurality of pieces of content are related to first content, and third data and fourth data are related to second content, the controller 520 may classify the first data and the second data as one set of data, and the third data and the fourth data as another set of data. Accordingly, when the data display apparatus 100 requests to provide data related to any one of the first and second content, the controller 520 may quickly and accurately provide data corresponding to the request.

The controller 520 may determine an order of the plurality of pieces of content. At this time, the controller 520 may determine the order of the plurality of pieces of content by considering characteristics of the event. For example, when the event according to at least one example embodiment releases pieces of content distinguishable according to the locations of the event, the controller 520 may determine the order of the plurality of pieces of content according to the locations where the plurality of pieces of content are arranged at the event using geolocation information included with the plurality of pieces of content, such as metadata (e.g., GPS coordinates included with the piece of content, etc.), user provided location information associated with the pieces of content, an IP address associated with the source of the piece of content, by parsing text embedded in the piece of content that indicates the location of the piece of content, by conducting image recognition analysis of the piece of content to identify landmarks associated with the location of the piece of content, etc. For example, if an event is hosted at more than one building, street address, city, etc., the plurality of pieces of content may be grouped and arranged according to each of the buildings, street addresses, cities, etc. As another example, if an event is hosted in more than one room or locations within a single building, etc., the plurality of pieces of content may be grouped and arranged according to each of the rooms or locations of the building, etc. At this time, the controller 520 may determine the order of the plurality of pieces of content according to an intended order of viewing the plurality of pieces of content at the place where the event is held. For example, the event may be an exhibition exhibiting various works of art. In this case, the controller 520 may determine an order of a first work of art before that of a second work of art when the first work of art is located to be viewed before the second work of art considering a viewing order intended by an organizer of the exhibition. Also, a viewing order intended by an organizer of an event may not be determined or at least one viewing path may exist, for example, the event may be an exposition in which a certain viewing path is not determined or may be an exhibition in which at least one viewing path exists. In this case, the controller 520 may determine the order of the plurality of pieces of content based on an alphabetical order, an order the plurality of pieces of content are produced, or various subjective or objective standards determined for each of the plurality of pieces of content, may arbitrarily determine the order of the plurality of pieces of content, and/or may randomly determine the order of the plurality of pieces of content.

Meanwhile, when the event according to at least one example embodiment generates the plurality of pieces of content, which are distinguishable according to time, the controller 520 may determine the order of the plurality of pieces of content based on the time or time period of each of the plurality of pieces of content. For example, content generated earlier may have a higher order than content generated later in time, from among the plurality of pieces of content, or vice versa. The time information associated with the plurality of pieces of content may be included in the plurality of pieces of content, such as metadata (e.g., a timestamp included with the piece of content, etc.), user provided time information associated with the pieces of content, by parsing text embedded in the piece of content that indicates the time of the piece of content, etc. As another example, the event may be a baseball game performed from various time periods associated with the baseball game, such as a first inning to a ninth inning, or from a first inning to an extra inning after a ninth inning. In this case, the controller 520 may determine an order of the first inning to be before those of the second through ninth innings, and an order of the ninth inning to be before that of the extra inning. Also, the event may be an event in which an accurate time order is not determined, for example, may be four tennis matches simultaneously played in four courts. In this case, the controller 520 may determine the order of the plurality of pieces of content based on times the plurality of pieces of content and/or the related event started, times when the plurality of pieces of content and/or the related event ended, alphabetical orders of names of players participating in the plurality of pieces of content, objective or subjective standards related to the players, or various objective or subjective standards determined with respect to the plurality of pieces of content, may arbitrarily determine the order of the plurality of pieces of content, or randomly determine the order of the plurality of pieces of content.

When the controller 520 classifies the plurality of pieces of data and determines the order of the plurality of pieces of content, the communicator 510 may provide the classified plurality of pieces of data according to the determined order of the plurality of pieces of content. At this time, the communicator 510 may provide the classified plurality of pieces of data to the data display apparatus 100.

The controller 520 may select related sources including data related to a certain event, from among the plurality of sources. For example, there may be the data production apparatuses 300 capable of transmitting data to the apparatus 500 through the communication network 400, and some of the data production apparatuses 300 may include the data related to the certain event. In this case, the controller 520 may select the data production apparatuses 300 including the data related to the desired event, i.e., the related sources, from among the data production apparatuses 300 connected to the apparatus 500 through the communication network 400, i.e., the plurality of sources. Also, the communicator 510 may collect the data related to the certain event from the related sources. At this time, the communicator 510 may selectively receive the data related to the certain event, or when the communicator 510 receives all data included in the selected data production apparatuses 300, the controller 520 may select the data related to the certain event. Alternatively, the communicator 510 may receive all data included in the data production apparatuses 300 connected to the apparatus 500 through the communication network 400 and select the data related to the certain event.

The controller 520 may generate a mini-map user interface or other user interface indicating the number of plurality of pieces of content and/or the order of the plurality of pieces of content. The mini-map user interface will be described later with reference to FIGS. 5A through 6B. The communicator 510 may provide the mini-map user interface to the data display apparatus 100.

The memory 540 may be a volatile or non-volatile memory capable of storing information, data, computer readable instructions, etc., such as a random access memory (RAM), a read only memory (ROM), a disc drive, a solid state drive, a flash drive, an optical drive, etc. The memory 540 may also include, or may be in communicative connection with (via bus 530) a mass storage device 560 that acts as a non-transitory computer-readable storage medium. Also, program codes (e.g., computer readable instructions) for the operating system 541 and other program codes associated with the communicator 510 and/or controller 520 may be stored in the memory 540. Such software constituent elements may be loaded from another non-transitory computer-readable storage medium separate from the memory 540 using a drive mechanism (not shown). The other non-transitory computer-readable storage medium may include, for example, a floppy disk, a hard disk, a tape storage device, a Bluray/DVD/CD-ROM, a memory card, etc. Software constituent elements may be loaded to the memory 540 through the network interface 550 instead of, or in addition to, the non-transitory computer-readable storage medium.

The bus 530 enables communication and data transmission between the constituent elements of the computer apparatus 500. The bus 530 may be configured using a high-speed serial bus, a parallel bus, a storage area network (SAN), and/or other appropriate communication technology.

Figure 3:
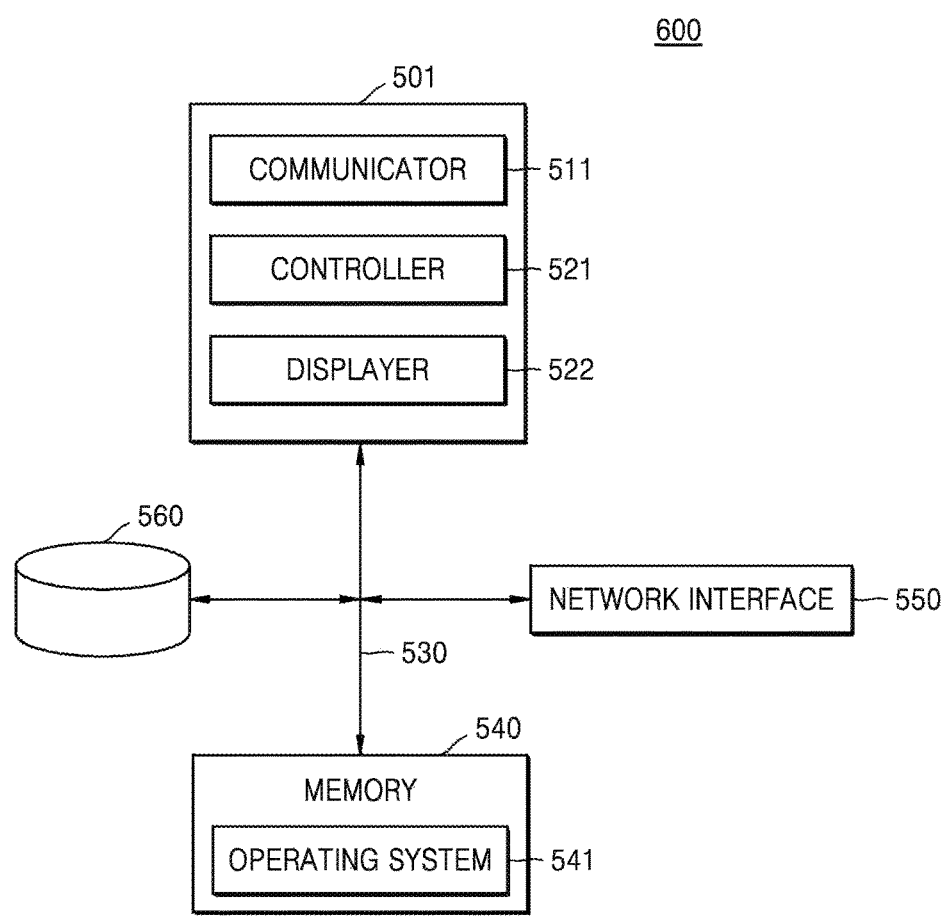
FIG. 3 is a block diagram of an internal structure of an apparatus for providing data, according to at least one example embodiment.

FIG. 3 is a block diagram of an internal structure of an apparatus 600 for providing data, according to another example embodiment.

Referring to FIG. 3, the apparatus 600 of the system 10, according to another example embodiment the processor 501 may include and/or be specially configured to execute as a communicator 511, a controller 521, and/or a displayer 522. Since structures and operations of the communicator 511 and the controller 521 of the apparatus 600 of FIG. 3 are almost the same as those of the communicator 510 and the controller 520 of the apparatus 500 of FIG. 2, the common details are not discussed again (e.g., processor 501, bus 530, memory 540, network interface 550, mass storage device 560, etc.), and only the differences will be described.

The communicator 511 may collect the plurality of pieces of data related to at least one of the plurality of pieces of content from the server. For example, when the apparatus 600 is included in the data display apparatus 100, the communicator 511 may collect the plurality of pieces of data related to at least one of the plurality of pieces of content from the data storage server 200. The communicator 511 may transmit and receive via the network interface 550 various types of data including the plurality of pieces of data related to at least one of the plurality of pieces of content to and from at least one of the data display apparatus 100, the data storage server 200, the data production apparatus 300, and/or the base station, via at least one wired/wireless connection.

The controller 521 may control overall operations of the apparatus 600. For example, the controller 521 may execute programs stored in a memory 540 included in the apparatus 600 to generally control the communicator 511. The controller 521 may classify the plurality of pieces of data related to at least one of the pieces of content based on which data is related to which content. Also, the controller 521 may determine an order of the plurality of pieces of content.

The displayer 522 may control at least one display device (not shown) to display the classified plurality of pieces of data according to the determined order of the plurality of pieces of content. The display device may be built-in or external to the apparatus 600. Also, the controller 521 may generate a mini-map user interface indicating the number of the plurality of pieces of content and/or the order of the plurality of pieces of content, and the displayer 522 may cause the display device to display the mini-map user interface. The mini-map user interface displayed on the display device will be described later with reference to FIG. 7.

Figure 4:
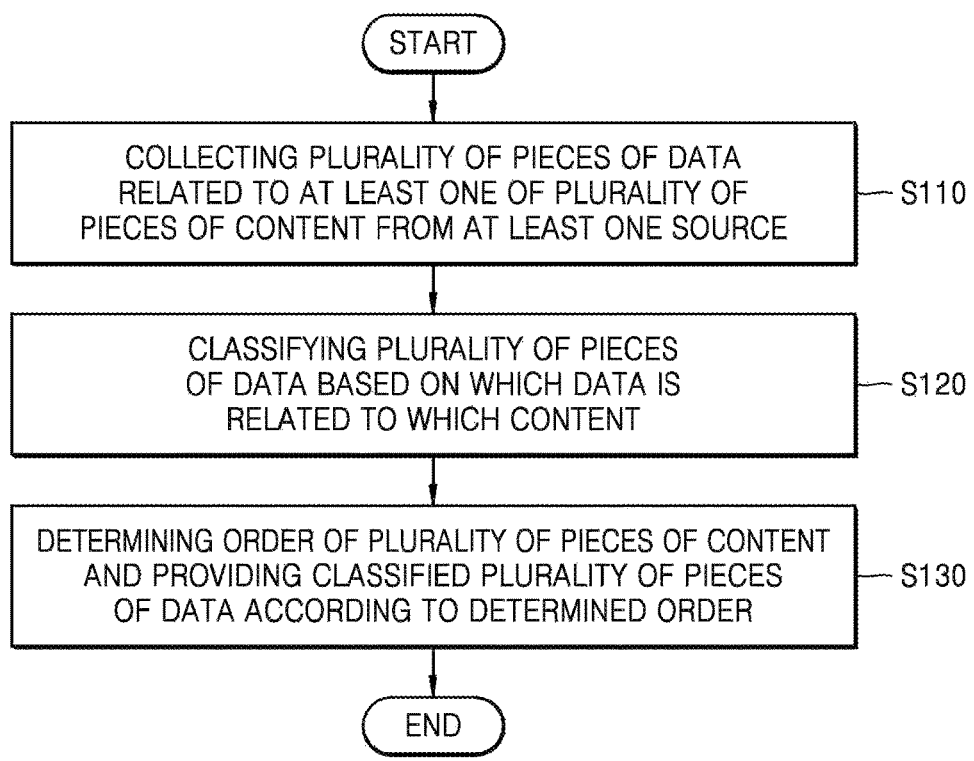
FIG. 4 is a flowchart of a method of providing data, according to at least one example embodiment.

FIG. 4 is a flowchart of a method of providing data, according to at least one example embodiment.

The method of FIG. 4 includes operations that are performed in time-series and/or real-time by the apparatus 500 or 600 of FIG. 2 or 3. Thus, details described above with reference to FIG. 2 or 3 are applied to the method of FIG. 4 even if omitted.

Referring to FIG. 4, a method of providing a plurality of pieces of data related to at least one of pieces of content released through or generated from a certain event, the method includes: collecting the plurality of pieces of data related to at least one of the plurality of pieces of content from at least one source (operation S110); classifying the plurality of pieces of data based on which data is related to which content (operation S120); and determining an order of the plurality of pieces of content and providing the classified plurality of pieces of data according to the determined order (operation S130). The at least one source in operation S110 may be at least one data production apparatus 300 or at least one data storage server 200. In operation S110, at least one related source including data related to the certain event may be selected from the at least one source, and the plurality of pieces of data related to at least one of the plurality of pieces of content may be collected from the at least one related source. Also, in operation S130, a mini-map user interface, or other user interface indicating the number of plurality of pieces of content and/or the order of the plurality of pieces of content may be provided.

FIGS. 5A through 6B are diagrams for describing examples of providing data through the method of FIG. 4 according to various example embodiments.

Figure 5A:
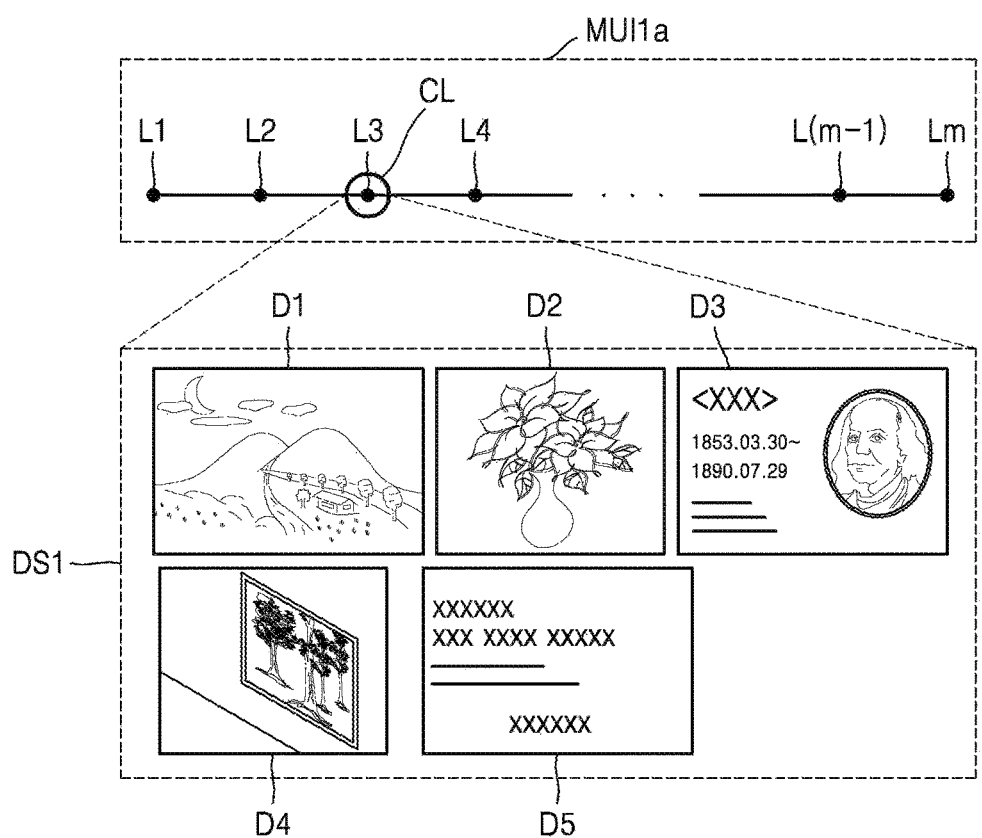
FIGS. 5A through 6B are diagrams for describing examples of providing data through the method of FIG. 4, according to at least one example embodiment.
Figure 5B:
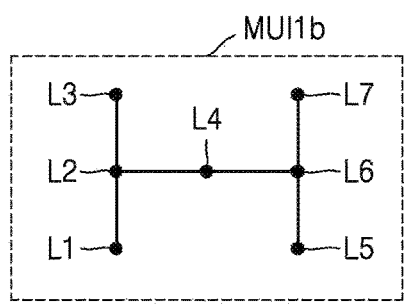

Referring to FIGS. 5A and 5B, the method according to FIG. 4 may provide a $1a^{th}$ mini-map user interface MUI1a indicating a number of a plurality of pieces of content L1 through Lm and/or an order, types, locations, source, etc. of the plurality of pieces of content L1 through Lm. Also, the method according to FIG. 4 may provide a plurality of pieces of data D1 through D5 related to the content L3 from among the plurality of pieces of content L1 through Lm.

When the plurality of pieces of content L1 through Lm are released at a place where a certain event is held, the apparatus 500 may provide a plurality of pieces of data related to the plurality of pieces of content L1 through Lm. At this time, the apparatus 500 may provide the plurality of pieces of data such that data related to one piece of content is distinguishable from data related to another piece of content, from among the plurality of pieces of content L1 through Lm. For example, as shown in FIG. 5A, the apparatus 500 may provide the plurality of pieces of data D1 through D5 related to the content L3 from among the plurality of pieces of content L1 through Lm, and may not provide data related to the remaining pieces of content L1, L2, and L4 through Lm while the plurality of pieces of data D1 through D4 are provided. The plurality of pieces of data D1 through D5 related to the content L3 may include drawings D1 and D2 depicting the content L3, an artist D3 who produced the content L3, a photo of the content L3, a writing D5 related to the content L3, etc. The apparatus 500 may assign the plurality of pieces of data D1 through D5 related to the content L3 as a first data set DS1. When the apparatus 500 is included in the data display apparatus 100, the apparatus 500 may provide data to the user by displaying visual information through a display device of the data display apparatus 100. When the apparatus 500 is included in the data storage server 200, the apparatus 500 may provide data by transmitting the data to the data display apparatus 100. Accordingly, the apparatus 500 provides data on which characteristics of a place where an event is held are reflected to the user, such that the user realistically views the event without having to personally visit the place.

While providing the plurality of pieces of data related to the plurality of pieces of content L1 through Lm, the apparatus 500 may also provide the $1a^{th}$ mini-map user interface MUI1a indicating the number of the plurality of pieces of content L1 through Lm and/or the order of the plurality of pieces of content L1 through Lm. For example, as shown in FIG. 5A, the apparatus 500 may provide the number of plurality of pieces of content L1 through Lm by indicating the number of dots, or other visual identifiers such as icons, etc., equal to the number of plurality of pieces of content L1 through Lm on the $1a^{th}$ mini-map user interface MUI1a. However, FIG. 5A is only an example, and the apparatus 500 may provide a mini-map user interface indicating the number of plurality of pieces of content L1 through Lm through any one of various methods recognizable by a person via five senses, such as a method of directly displaying the number of plurality of pieces of content L1 through Lm and a method of displaying the number of plurality of pieces of content L1 through Lm correspondingly to a color, sound, haptic feedback, etc. Also, the apparatus 500 may provide the order of the plurality of pieces of content L1 through Lm by listing the dots or other indicator indicating the plurality of pieces of content L1 through Lm in a certain order on the $1a^{th}$ mini-map user interface MUM a. When the place where the event is held is not a linear place, the apparatus 500 may provide a $1b^{th}$ mini-map user interface MUI1b reflecting a shape, layout, map, etc., of the place as shown in FIG. 5B. However, the $1a^{th}$ and $1b^{th}$ mini-map user interfaces MUI1a and MUI1b of FIGS. 5A and 5B are only examples, and the apparatus 500 may provide any type of mini-map user interface capable of indicating the order of the plurality of pieces of content L1 through Lm. Additionally, while FIGS. 5A and 5B are discussed in relation to a single event, the example embodiments are not limited thereto and may include a plurality of events. Accordingly, the apparatus 500 may provide, to the user, information about the number of pieces of content related to at least one desired event, or about an amount of data related to content provided to the user.

Figure 6A:
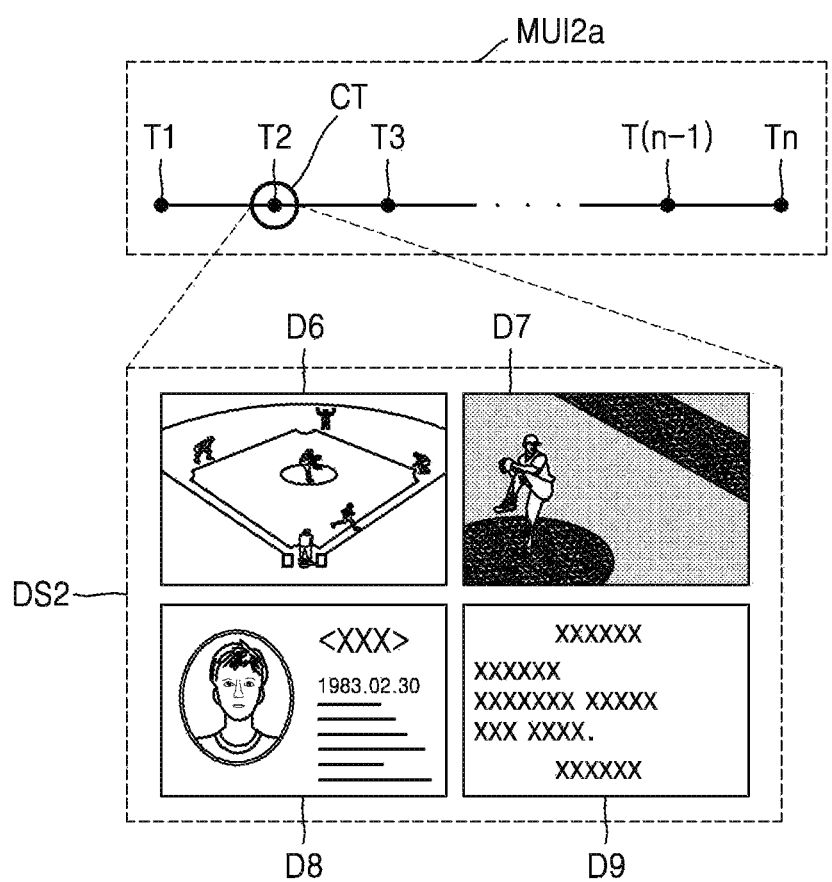
Figure 6B:
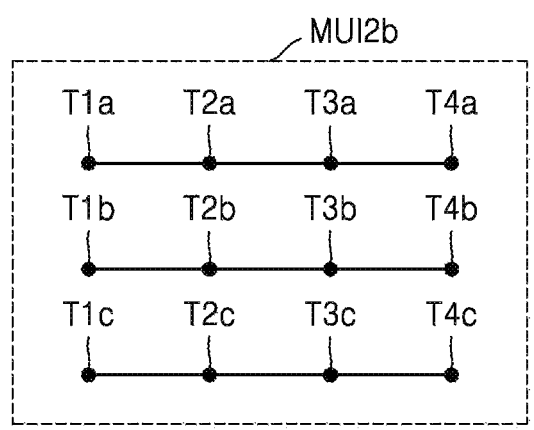

Referring to FIGS. 6A and 6B, the method according to FIG. 4 may provide a $2a^{th}$ mini-map user interface MUI2a indicating the number of a plurality of pieces of content T1 through Tn and/or an order, types, locations, sources, etc., of the plurality of pieces of content T1 through Tn. Also, the method according to FIG. 4 may provide a plurality of pieces of data D6 through D9 related to the content T2 from among the plurality of pieces of content T1 through Tn.

When the plurality of pieces of content T1 through Tn are generated at a place where an event is held, the apparatus 500 may provide a plurality of pieces of data related to the plurality of pieces of content T1 through Tn. At this time, the apparatus 500 may provide the plurality of pieces of data such that data related to one piece of content is distinguishable from data related to another piece of content from among the plurality of pieces of content T1 through Tn. For example, as shown in FIG. 6A, the apparatus 500 may provide the plurality of pieces of data D6 through D9 related to the content T2 from among the plurality of pieces of content T1 through Tn, and may not provide data related to the remaining pieces of content L1, L2, and L4 through Lm while the plurality of pieces of data D6 through D9 are provided. The plurality of pieces of data D6 through D9 related to the content T2 may include a photo D6 showing an overall situation of the content T2, a photo D7 showing a certain play played in the content T2, a player D8 participating in the content T2, and a writing D9 related to the content T2, etc. The apparatus 500 may assign the plurality of pieces of data D6 through D9 related to the content T2 as a second data set DS2. When the apparatus 500 is included in the data display apparatus 100, the apparatus 500 may provide data to the user by displaying visual information through the display device of the data display apparatus 100. When the apparatus 500 is included in the data storage server 200, the apparatus 500 may provide data by transmitting the data to the data display apparatus 100. Accordingly, the apparatus 500 provides data on which a time order of a certain event is reflected to the user such that the user may easily check a summary of the event without having to directly view the event at a time when the event was held.

While providing the plurality of pieces of data related to the plurality of pieces of content T1 through Tn, the apparatus 500 may also provide the $2a^{th}$ mini-map user interface MUI2a indicating the number of the plurality of pieces of content T1 through Tn and/or the order of the plurality of pieces of content T1 through Tn. For example, as shown in FIG. 6A, the apparatus 500 may provide the number of plurality of pieces of content T1 through Tn by indicating the number of dots, or other indicator (e.g., visual, audible, haptic, etc.), equal to the number of plurality of pieces of content T1 through Tn on the $2a^{th}$ mini-map user interface MUI2a. However, FIG. 6A is only an example, and the apparatus 500 may provide a mini-map user interface indicating the number of plurality of pieces of content T1 through Tn through any one of various methods recognizable by a person via five senses, such as a method of directly displaying the number of plurality of pieces of content T1 through Tn and a method of displaying the number of plurality of pieces of content T1 through Tn correspondingly to a color, text, image, sound, haptic feedback, etc. Also, the apparatus 500 may provide the order of the plurality of pieces of content T1 through Tn by listing the dots, or other indicators, indicating the plurality of pieces of content T1 through Tn in a certain order on the $2a^{th}$ mini-map user interface MU21a. When the event includes a plurality of events (for example, three games), in which a time order is not accurately determined, the apparatus 500 may provide a $2b^{th}$ mini-map user interface MUI2b reflecting the plurality of games through individual user interfaces indicating the games, as shown in FIG. 6B. However, the $2a^{th}$ and $2b^{th}$ mini-map user interfaces MUI2a and MUI2b of FIGS. 6A and 6B are only examples, and the apparatus 500 may provide any type of mini-map user interface capable of indicating the order of the plurality of pieces of content T1 through Tn. Additionally, while FIGS. 6A and 6B are discussed in relation to a single event, the example embodiments are not limited thereto and may include a plurality of events. Accordingly, the apparatus 500 may provide, to the user, information about the number of pieces of content related to at least one desired event, or about an amount of data related to content provided to the user.

Figure 7:
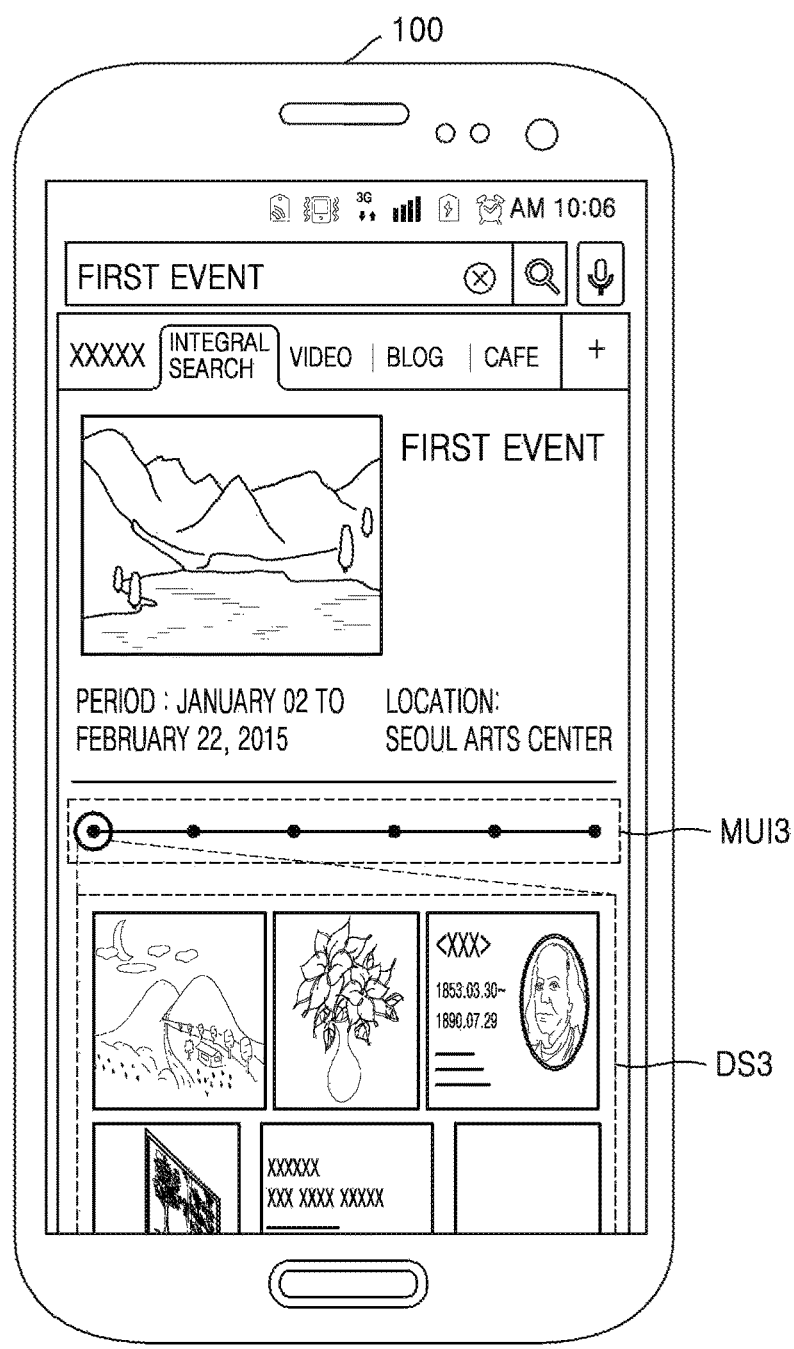
FIG. 7 illustrates an example of providing data through the method of FIG. 4 according to at least one example embodiment.

FIG. 7 illustrates an example of providing data through the method of FIG. 4 according to at least one example embodiment.

Referring to FIG. 7, the data display apparatus 100 included in the system 10 according to at least one example embodiment may display data provided according to the method of providing data, according to at least one example embodiment, while displaying information about at least one desired event.

The data display apparatus 100 may display the provided data on a display device of the data display apparatus 100. At this time, the data display apparatus 100 may display a third data set DS3 including a plurality of pieces of data related to a plurality of pieces of content, and display a third mini-map user interface MUI3 indicating the number and/or order of the plurality of pieces of content.

The data display apparatus 100 may provide data related to a desired event according to at least one example embodiment, while providing a service other than a method of providing data, according to at least one example embodiment. For example, as shown in FIG. 7, the data display apparatus 100 may provide a general search service. At this time, when the user of the data display apparatus 100 requests for a search result of a first event, the data display apparatus 100 may provide data related to the first event through the method of providing data, according to at least one example embodiment.

Accordingly, a method and apparatus for providing data, in which data related to various events, such as exhibitions, expositions, performances, concerts, weddings, parties, conferences, receptions, galas, rallies, speeches, and sports games, etc., may be provided.

Also, a method and apparatus for providing data, in which data related to an event, such as an exhibition, an exposition, a performance, a concert, a wedding, a party, a conference, a reception, a gala, a rally, a speech, and a sports game, etc., is providable by reflecting characteristics of a place where the event is held, may be provided.

Also, a method and apparatus for providing data, in which data related to an event, such as an exhibition, an exposition, a performance, a concert, a wedding, a party, a conference, a reception, a gala, a rally, a speech, and a sports game, etc., is providable by reflecting a time order of the event, may be provided.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, or computer storage medium or device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method of providing a plurality of pieces of data related to at least one of a plurality of pieces of content released through or generated from an event, the method comprising:
    collecting, using at least one processor, the plurality of pieces of data related to the at least one of the plurality of pieces of content from at least one source user device over a network;
    classifying, using the at least one processor, the plurality of pieces of data in accordance with a relationship between the data and the content;
    determining, using the at least one processor, an order of the plurality of pieces of content based on geolocation information corresponding to where the plurality of pieces of content are physically located in relation to the event using geolocation metatags embedded in the plurality of pieces of content;
    generating, using the at least one processor, a mini-map user interface representing a physical location of the event, the mini-map user interface showing the number of the plurality of pieces of content and an order of the plurality of pieces of content, and the plurality of pieces of content displayed on the mini-map user interface in accordance with their physical locations in relation to the event based on the determined order; and
    providing, using the at least one processor, the mini-map user interface to a display device over the network, wherein the mini-map user interface includes a plurality of indications corresponding to each of the plurality of pieces of content, and in response to a user selection of at least one of the plurality of indications, displays the corresponding piece of content on the display device.

2. The method of claim 1, wherein the collecting comprises:
    selecting, using the at least one processor, at least one related source including data related to the event from among the at least one source; and
    collecting, using the at least one processor, the plurality of pieces of data related to the at least one of the plurality of pieces of content from the at least one related source.

3. The method of claim 1, wherein the event is an exhibition exhibiting various works of art,
    the plurality of pieces of content are works of art exhibited in the exhibition, and
    the plurality of pieces of data comprise at least one of photos of the works of art, drawings depicting the works of art, writings describing or evaluating the works of art, videos of the works of art, sound sources portraying or evaluating the works of art, scents portraying the works of art, and photos, drawings, writings, videos, and sound sources related to artists who produced the works of art.

4. The method of claim 1, wherein the event is an exposition showcasing various products,
    the plurality of pieces of content are products showcased in the exposition, and
    the plurality of pieces of data comprise at least one of photos of the products, drawings depicting the products, writings describing or evaluating the products, videos of the products, sound sources portraying or evaluating the products, scents portraying the products, and photos, drawings, writings, videos, and sound sources of people who manufactured, designed, or invented the products.

5. The method of claim 1, wherein the providing comprises determining an order of the plurality of pieces of content based on a desired order for viewing the plurality of pieces of content in the event.

6. The method of claim 1, wherein
    the event is an event in which the plurality of pieces of content that are distinguishable are generated according to time, and
    the providing comprises determining an order of the plurality of pieces of content such that the pieces of content generated earlier has a higher order than the pieces of content generated later in time.

7. The method of claim 6, wherein
    the event is a performance that is performed according to time, the plurality of pieces of content are acts of the performance, actions taking place during the performance, or performers participating in the performance, and the plurality of pieces of data comprise at least one of photos of the acts of the performance, drawings depicting the acts of the performance, writings describing or evaluating the acts of the performance, video showing the acts of the performance, sound sources portraying or evaluating the acts of the performance, photos, drawings, writings, video, and sound sources related to a manufacturer or planner of the performance, photos of the performers, drawings depicting the performers, writings describing or evaluating the performers, videos showing the performers, and sound sources portraying or evaluating the performers.

8. The method of claim 6, wherein the event is a game performed according to time, the plurality of pieces of content are time periods of the game, plays performed during the game, or players participating in the game, and the plurality of pieces of data comprise at least one of the time periods of the game, drawings depicting the time periods of the game, writings describing or evaluating time periods of the game, videos of the time periods of the game, sound sources of the time periods of the game, photos of the players, drawings depicting the players, writings describing or evaluating the players, video of the players, and sound sources portraying or evaluating the players.

9. The method of claim 1, wherein the providing comprises providing the plurality of pieces of data according to data related to one of the plurality of pieces of content.

10. The method of claim 1, wherein the providing comprises providing the plurality of pieces of data such that data related to one piece of content from among the plurality of pieces of content is distinguishable from data related to another piece of content from among the plurality of pieces of content, and providing the mini-map user interface such that content related to data currently provided is distinguished from other pieces of content on the mini-map user interface.

11. A non-transitory computer-readable recording medium having recorded thereon computer readable instructions, which when executed by at least one processor, cause the at least one processor to perform the method of claim 1.

12. A distribution server configured to distribute computer readable instructions, which when executed by at least one processor, cause the at least one processor to perform the method of claim 1.

13. An apparatus for providing a plurality of pieces of data related to at least one of a plurality of pieces of content released through or generated from an event, the apparatus comprising:

a memory having computer readable instructions stored thereon; and at least one processor configured to execute the computer readable instructions to, receive the plurality of pieces of data related to the at least one of the plurality of pieces of content from a plurality of sources user devices over a network, classify the plurality of pieces of data in accordance with a relationship between the data and the content, determine an order of the plurality of pieces of content based on geolocation information corresponding to where the plurality of pieces of content are physically located in relation to the event using geolocation metatags embedded in the plurality of pieces of content, generating, using the at least one processor, a mini-map user interface representing a physical location of the event, the mini-map user interface showing the number of the plurality of pieces of content and an order of the plurality of pieces of content, and the plurality of pieces of content displayed on the mini-map user interface in accordance with their physical locations in relation to the event based on the determined order; and provide the mini-map user interface to display device over the network, wherein the mini-map user interface includes a plurality of indications corresponding to each of the plurality of pieces of content, and in response to a user selection of at least one of the plurality of indications, displays the corresponding piece of content on the display device.

14. The apparatus of claim 13, wherein the at least one processor is further configured to:

select at least one related source including data related to the event from among the plurality of sources; and collect the plurality of pieces of data related to the at least one of the plurality of pieces of content from the at least one related source.

15. The apparatus of claim 13, wherein the event is an event in which content distinguishable according to locations is released.

16. The apparatus of claim 15, wherein the at least one processor is configured to determine an order of the plurality of pieces of content based on a desired order of viewing the plurality of pieces of content in the event.

17. The apparatus of claim 13, wherein the event is an event in which the plurality of pieces of content that are distinguishable are generated according to time, and the at least one processor is configured to determine an order of the plurality of pieces of content such that the pieces of content generated earlier has a higher order than the pieces of content generated later in time.

18. The apparatus of claim 13, wherein the at least one processor is configured to:

provide the plurality of pieces of data such that data related to one piece of content from among the plurality of pieces of content is distinguishable from data related to another piece of content from among the plurality of pieces of content; and generate the mini-map user interface such that content related to data currently provided is distinguished from other pieces of content on the mini-map user interface.

19. An apparatus for providing a plurality of pieces of data related to at least one of a plurality of pieces of content released through or generated from an event, the apparatus comprising:

a memory having computer readable instructions stored thereon; and at least one processor configured to execute the computer readable instructions to, receive the plurality of pieces of data related to the at least one of the plurality of pieces of content from a server, classify the plurality of pieces of data based on which data is related to which content, determine an order of the plurality of pieces of content based on geolocation information corresponding to where the plurality of pieces of content are physically located in relation to the event using geolocation metatags embedded in the plurality of pieces of content, generate a mini-map user interface representing a physical location of the event, the mini-map user interface showing the number of the plurality of pieces of content and an order of the plurality of pieces of content, and the plurality of pieces of content displayed on the mini-map user interface in accordance with their physical locations in relation to the event based on the determined order, and display the mini-map user interface using a display device, wherein the mini-map user interface includes a plurality of indications corresponding to each of the plurality of pieces of content, and in response to a user selection of at least one of the plurality of indications, displays the corresponding piece of content on the display device.

20. A system comprising:

a memory having computer readable instructions stored thereon; and at least one processor configured to execute the computer readable instructions to, receive a plurality of content related to a plurality of events, group the plurality of content in accordance with at least one characteristic of the plurality of content, determine a desired arrangement of the plurality of content based on the groupings of the plurality of content and the event associated with the plurality of content, and based on geolocation information corresponding to where the plurality of pieces of content are physically located in relation to the event using geolocation metatags embedded in the plurality of pieces of content, generate a user interface associated with the determined desired arrangement, the user interface including a plurality of indicators associated with the determined desired arrangement, the plurality of indicators when activated displaying at least one associated content in accordance with the grouping of the plurality of content, the user interface including a mini-map representing a physical location of the event, and the plurality of pieces of content displayed on the mini-map in accordance with their physical locations in relation to the event based on the determined desired arrangement; and display the generated user interface on a display device, wherein the generated user interface includes a plurality of indications corresponding to each of the plurality of pieces of content, and in response to a user selection of at least one of the plurality of indications, displays the corresponding piece of content on the display device.

21. The system of claim 20, wherein the receiving includes receiving the plurality of content from a plurality of computing devices.

22. The system of claim 20, wherein the displaying includes transmitting the generated user interface to a plurality of computing devices.

23. The system of claim 20, wherein the grouping includes grouping the plurality of content in accordance with geolocation information associated with each of the plurality of content.

* * * * *